Sept. 22, 1953  F. K. CARLSON  2,652,738
LOCKING ARBOR
Filed Oct. 26, 1950

INVENTOR.
FOLKE K. CARLSON
BY
ATTORNEY

UNITED STATES PATENT OFFICE 2,652,738

LOCKING ARBOR

Folke K. Carlson, Mount Kisco, N. Y., assignor to General Precision Laboratory Incorporated, a corporation of New York Application October 26, 1950, Serial No. 192,209

1 Claim. (Cl. 82—43)

This invention relates to a locking arbor for supporting a work piece in a machine tool. More specifically, it relates to an arbor, mandrel or axle for manual insertion in a bore in a work piece to support it for rotation in a machine tool about the axis of the bore, for use in precision repetitive manufacture.

In metal working practice it often becomes necessary to rotate a work piece about an axial bore therein in order to perform a machine tool operation upon such work piece. The machine tool may be a lathe, milling machine, or grinder, and the operation may be, for instance, cylindrical turning, facing, grinding, or polishing. The conventional method of mounting is to press the work onto either a solid or expansion arbor. In either case an arbor press must be employed to press the work piece on the arbor and again after the operation has been completed to press the work off the arbor.

This method of holding work has in the past been completely unsuited to precision quantity production for a number of reasons. The most important being that the application and removal by an arbor press is slow, often taking more time than the machine tool operation itself. Ordinarily but one or two arbor presses are provided for an entire machine shop, and this quantity is not adequate to serve a number of operators engaged in making the same design of article.

It is essential, in precision quantity manufacture to apply the work piece to the machine tool both quickly and precisely and to be able to remove it instantly after the operation has been completed. Superficially, the overrunning clutch principle would seem to be suitable for easy application to these requirements, but the many attempts so to apply it have in every case resulted in the attainment of only low precision. When application has been attempted to manufacturing with tolerances in the tenths of thousandths, all of these methods have failed. Consequently, in highly precise repetitive manufacture it still is necessary, when work is to be held on an arbor, to press it on, perform the operation, and press it off again.

In all applications of the overrunning clutch principle to the construction of a locking clutch a cylindrical member has been provided in a longitudinal recess in the arbor, with the expectation that wedging action will take place along a line of contact between the cylindrical member and the bore of the work piece placed on the arbor. This does not in fact occur, at least not uniformly and invariably, for usually one end of the cylindrical member wedges first, and accordingly the work piece is cocked to some extent, its axis not being parallel to that of the arbor and the divergence varying in kind and degree from piece to piece. This results in such uncertainty of precision that none of these methods can be used in high precision manufacture. For instance, in the machining of, say 1000 pieces by this method, variations of the order of thousandths of an inch are found, while in the machining of a like number of pieces by the means of this invention reproducibility of the order of one tenth of one thousandth of an inch is attained.

The present invention successfully overcomes all of the limitations heretofore preventing use of self-locking arbors for operations of the highest precision. It provides means for applying work by hand to an arbor with such accuracy and stability of positioning as to permit turning and other operations with repetitive accuracy on the order of one tenth of a thousandth of an inch. It also provides means for instantly removing the work by hand from the arbor after the machine operation has been completed.

Briefly, the invention provides a cylindrical pin that is a wringing or running fit in the hole by which the work piece is to be held. The pin contains a recess in which there is a loose bulbous or spherical member. When the work piece is pushed onto the pin and rotated by hand in one direction, the bulbous or spherical member rolls in its recess so as to wedge itself between the pin and the work piece, making substantially point contact with the work piece at approximately the middle of its bearing length and drawing the opposite side of the hole into intimate and accurate contact with a large part of the opposing side of the pin. In this rigid and accurately reproducible position the machining operation may be performed on the work piece. Rotation of the work piece by hand in the opposite direction releases the wedged bulbous or spherical member and permits the work piece to be easily drawn off the pin.

The objective then of this invention is to provide means for holding work on an arbor during a machine tool operation with such reproducible accuracy as to permit of high machining accuracy yet so as to permit rapid manual application and removal of the work without the aid of tools.

More generally, the objective of this invention is to provide wedging means to secure a pin or cylinder in a hole, the wedging means being easily and manually applied and removed and the resulting positional relation of the pin or cylinder and the hole being highly precise and invariably reproducible.

A further understanding of this invention may be secured from the detailed description and the drawings, in which.

Figure 1:
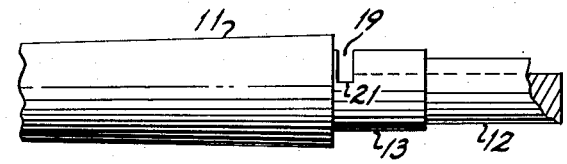
Figures 1 and 2 are side and end views of an arbor designed in accordance with this invention, Fig. 1 being partly in cross section on the line 1—1 of Fig. 2.
Figure 2:
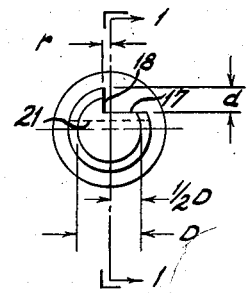

Referring now to Fig. 1, an arbor is depicted having a shaft 11 of the standard taper to fit in the machine tool by which a machining operation is to be made, as for instance, in the headstock of a lathe. The arbor is provided with a pin or cylindrical portion 12 to hold the work piece or the work, as it is sometimes called, by means of a bore therein. The pin 12 is connected to the tapered part 11 by an enlarged part 13. The diameter of the pin 12 is about ¼ inch in this example, the figures being drawn to a somewhat enlarged scale for clarity. This dimension is marked D in Fig. 2 which is a view of the arbor of Fig. 1 looking toward its pin end. The precise diameter depends upon the diameter and tolerance of the hole in the work piece that is to be machined. For instance, if the hole has a diameter varying in different pieces from .2500 to .2503 inch, the pin should have a diameter of not over .2500 inch and not less than about .2492 inch. If the work piece and the pin are held to these tolerance limits the fit will be no tighter than a wringing fit, and no looser than a loose running fit. That is, in all cases the work can be easily slid on and off the pin by hand. It is preferred that the material of the pin 12 be steel, hardened and ground.

Figure 3:
Figure 3 depicts a bulbous pin for use with the arbor of Figs. 1 and 2.

Fig. 3 depicts a hardened and ground steel pin having a slightly enlarged or bulbous portion 14 and a head 16. The diameter of this pin is .062 inch while that of the enlargement, marked B, is but four thousandths of an inch larger, or .066 inch, the drawing showing the bulbous portion greatly exaggerated for clarity of illustration. This bulbous pin is designed to lie in a groove cut for the purpose in the pin 12. This groove has a cross section consisting of a straight bottom portion 17, Fig. 2, and a straight side wall 18. The maximum depth of the groove, approximately shown at d, is equal to the thickness of the bulb 14, Fig. 3, or .066 inch, so that the plane bottom 17 of the groove is at a distance of the pin radius minus .066 inch, or .059 inch, from the center of the pin 12. The plane side wall 18 of the groove is perpendicular to the bottom 17 and its plane is at a distance from the center line of the pin equal to one-half of the diameter of the bulb 14, or .033 inch. This distance is marked "r" in Fig. 2. A groove 19 is cut in the enlarged portion 13 of the arbor, wider than the thickness of the pin head 16 and deeper than the shoulder thereof. Its bottom is shown at 21 in Figs. 1 and 2. The distance A from the shoulder of the head 16, Fig. 3, to the center of the bulb is such that when the pin is laid in the groove in pin 12, with the head 16 in the slot 19, the bulb will lie in the transverse center plane of the work piece.

Figure 4:
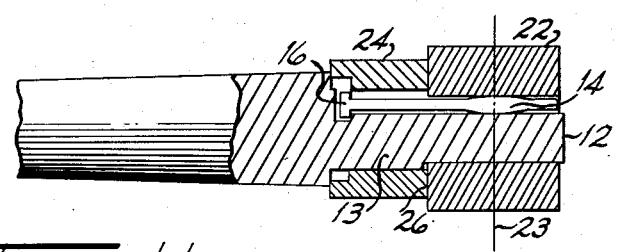
Figures 4 and 5 are side and end views of the arbor of Figs. 1 and 2 with a work piece thereon, Fig. 4 being a cross section on 4—4, Fig. 5.

This is illustrated in Fig. 4 in which a work piece 22 is shown in place on the pin 12. The length of the work piece is ½ inch, and the bulb 14 of the bulbous pin lies in the center transverse plane represented by the dot-dash line 23. The collar 24 has merely the function of loosely confining the head 16 of the bulbous pin, and is press fitted onto the enlarged portion 13 of the arbor. The collar 24 projects slightly at 26 beyond the enlarged portion 13 of the arbor to form a stop against which the work piece 22 can be firmly seated when put on the arbor.

Figure 5:
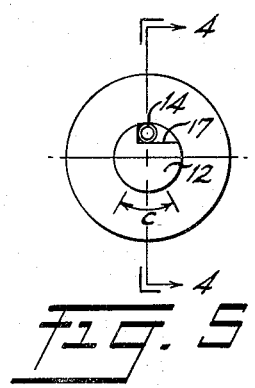

In applying the work piece 22 to the arbor it is twisted onto the pin 12 with a motion that is counterclockwise from the point of view of an observer looking at the free end of the pin 12. As the work piece goes on, therefore, when its bore touches the bulbous part 14 of the bulbous pin lying loosely in the groove, the bulbous pin is rolled by the clockwise twisting motion into the deepest part of the groove, where it assumes the position illustrated in Fig. 5 at 14, the bulb not projecting beyond the circular outline of the pin 12. Thus the fit is not tighter than that classed as a wringing fit, the bulb does not impede the application of the work to the arbor, and the work piece is easily slid on the full distance until stopped by the shoulder 26. The work piece 22 is now manually twisted in a clockwise direction. This action rolls the bulb 14, Fig. 5, toward the right, and in so rolling it encounters the gradually diminishing space between the bottom 17 of the groove and the interior wall or bore of the work piece. A powerful wedging action is thus set up and as the result the work piece 22 is held to the pin 12 with the greatest firmness. Contact on one side is approximately point contact at the bulb, being modified to a small surface contact only by elastic deformation of both the bulb and the bore. Contact on the opposite side of the work piece is between a broad surface area of the bore and the opposing surface of the pin 12, and occurs around an appreciable fraction of the circumference. This arc is roughly indicated at C in Fig. 5. The length of contact is over the entire length of the bore. Because of the large area of contact involved, there is but slight deformation of either the work or the pin 12 in this area, the depth of deformation being measured in millionths of an inch.

When the work piece is placed on the pin arbor any tendency towards cocking of the work piece, that is, angular displacement of the axis of the work piece as respects the axis of the pin arbor is prevented by the natural fulcruming of the work piece about the single point contact between the work piece and bulb 14. Thus the work piece is positioned relative to the pin 12 with a high degree of accuracy and at the same time such accuracy of placement is attained with a minimum expenditure of time on the part of the operator.

In machining the work piece, it is obvious that the arbor must be rotated counterclockwise so that the drag of the tool on the work piece will tend to tighten it, not loosen it.

In order to remove the work piece, it is only necessary to stop the machine and to twist the work piece off the arbor by hand, using a counterclockwise twisting motion that first unlocks the work, then keeps the bulbous pin at its loose position in the groove while the work piece is being drawn from the arbor.

Figure 6:
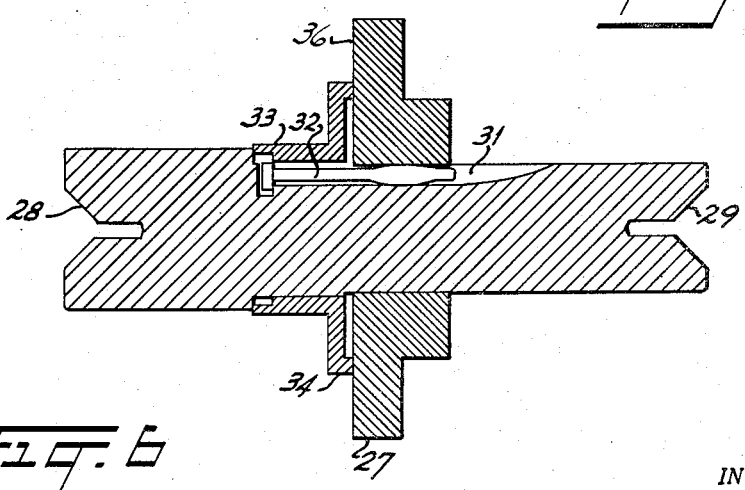
Figure 6 is a section of an arbor to be held between centers illustrating a further application of the invention.

Fig. 6 is an illustration of the application of the invention to an arbor designed to be held between lathe centers. In this figure a work piece 27 similar to a pinion blank and having say a one-half inch bore is shown to a somewhat enlarged scale for clarity. The blank may be ⅜ inch thick including its hub and is held on an arbor that is center drilled at both ends at 28 and 29, so that it can be held between the headstock center and tailstock center of a lathe and driven by means of a dog. The construction of the arbor is similar to that of Fig. 1 in most other respects. A groove 31 is similar in cross section to that shown in Fig. 2 and holds a bulbous pin 32 having dimensional relations similar to those described before. The groove 31 can of course be terminated as shown or run to the end of the arbor. The sleeve 33 has an enlarged diameter at the shoulder 34 so that the work piece 27 when pressed against the shoulder will be positioned with its face 36 truly perpendicular to the axis of the arbor. This becomes important when the work piece is of thin disc shape, with a small axial length.

What is claimed is:

A work holding arbor provided with a cylindrical portion having a longitudinal angular recess projecting inwardly from the surface thereof, the bottom of said recess lying in a plane parallel to the axis of said cylindrical portion, a roller in said recess having an enlarged bulbous portion intermediate its length, the diameter of said bulbous portion increasing from each end thereof, said bulbous portion being positioned to engage a limited area of one surface of the bore of a work piece placed on said cylindrical portion to draw the diametrically opposite surfaces of the bore of the work piece tightly against said cylindrical portion and to lock said work piece on said arbor.

FOLKE K. CARLSON.

References Cited in the file of this patent

UNITED STATES PATENTS

| Number | Name | Date |
|---|---|---|
| 249,143 | Cottrell | Nov. 1, 1881 |
| 582,225 | Prentice | May 11, 1897 |
| 593,082 | Christopher | Nov. 2, 1897 |
| 799,443 | Bower | Sept. 12, 1905 |
| 975,043 | Jaeger | Nov. 8, 1910 |
| 1,050,575 | Stryhal | Jan. 14, 1913 |
| 1,798,002 | Silbaugh | Mar. 24, 1931 |
| 2,111,796 | Meader | Mar. 22, 1938 |
| 2,388,521 | Boyd | Nov. 6, 1945 |
| 2,543,840 | Fisher | Mar. 6, 1951 |

FOREIGN PATENTS

| Number | Country | Date |
|---|---|---|
| 386,435 | Great Britain | Jan. 19, 1933 |

OTHER REFERENCES

American Machinist, Vol. 45, No. 12, page 518, 1916.